(12) United States Patent
Ren

(10) Patent No.: US 12,081,041 B2
(45) Date of Patent: Sep. 3, 2024

(54) SHIELDING STRUCTURES FOR WIRELESS CHARGING SYSTEMS

(71) Applicant: Apple Inc., Cupertino, CA (US)

(72) Inventor: Saining Ren, Auckland (NZ)

( * ) Notice: Subject to any disclaimer, the term of this patent is extended or adjusted under 35 U.S.C. 154(b) by 0 days.

(21) Appl. No.: 17/708,411

(22) Filed: Mar. 30, 2022

(65) Prior Publication Data

US 2022/0320912 A1 Oct. 6, 2022

Related U.S. Application Data

(60) Provisional application No. 63/167,815, filed on Mar. 30, 2021.

(51) Int. Cl.
*H02J 50/70* (2016.01)
*H01F 1/04* (2006.01)
*H02J 50/10* (2016.01)

(52) U.S. Cl.
CPC ............... *H02J 50/70* (2016.02); *H01F 1/04* (2013.01); *H02J 50/10* (2016.02)

(58) Field of Classification Search
None
See application file for complete search history.

(56) References Cited

U.S. PATENT DOCUMENTS

| | | | |
|---|---|---|---|
| 7,891,528 B2 | 2/2011 | Costa et al. | |
| 7,981,528 B2 * | 7/2011 | Nakatani | G06K 19/07749 428/692.1 |
| 10,553,002 B2 | 2/2020 | Armstrong-Muntner | |
| 10,784,030 B2 | 9/2020 | Lee et al. | |
| 11,005,175 B2 * | 5/2021 | Lim | H01Q 1/526 |
| 11,159,054 B2 | 10/2021 | Pinciuc et al. | |
| 11,165,273 B2 | 11/2021 | Graham et al. | |
| 11,799,329 B2 * | 10/2023 | Jadidian | H01F 27/366 |
| 2008/0246571 A1 | 10/2008 | Guenther | |
| 2013/0242475 A1 | 9/2013 | Sloey | |
| 2014/0042824 A1 | 2/2014 | Fells et al. | |
| 2014/0327394 A1 * | 11/2014 | Asselin | H01F 38/14 320/108 |

(Continued)

FOREIGN PATENT DOCUMENTS

| | | |
|---|---|---|
| CN | 105990002 | 10/2016 |
| EP | 3451495 | 3/2019 |

(Continued)

*Primary Examiner* — Kevin M Bernatz
(74) *Attorney, Agent, or Firm* — Polsinelli PC

(57) ABSTRACT

Implementations described herein provide systems and methods for wireless charging. In one implementation, a portable electronic device comprises a housing, a planar inductor coil, and a ferromagnetic shield. The planar inductor coil is disposed in the housing and comprises a conductive wire wound a plurality of turns about a center point and in increasing radii. The ferromagnetic shield is disposed in the housing and overlaps the planar inductor coil. The ferromagnetic shield comprises a first layer comprising a first plurality of iron-based nanocrystalline ribbons arranged in adjacent rows along a first direction and a second layer comprising a second plurality of iron-based nanocrystalline ribbons overlapping the first layer. The second plurality of iron-based nanocrystalline ribbons is arranged in adjacent rows along a second direction different from the first direction.

24 Claims, 9 Drawing Sheets

(56) References Cited

U.S. PATENT DOCUMENTS

| | | | | |
|---|---|---|---|---|
| 2014/0374860 A1* | 12/2014 | Suzuki | ............... | H10B 61/22 |
| | | | | 257/422 |
| 2015/0280450 A1 | 10/2015 | Park et al. | | |
| 2015/0302985 A1 | 10/2015 | Kurs | | |
| 2016/0057900 A1* | 2/2016 | Polak | ............... | H01F 27/36 |
| | | | | 156/60 |
| 2016/0064814 A1* | 3/2016 | Jang | ............... | H02J 50/12 |
| | | | | 174/377 |
| 2017/0104358 A1* | 4/2017 | Song | ............... | H01F 27/08 |
| 2018/0062417 A1* | 3/2018 | Choi | ............... | H01F 38/14 |
| 2018/0114984 A9 | 4/2018 | Wu et al. | | |
| 2019/0148988 A1* | 5/2019 | Hwang | ............... | H01Q 1/526 |
| | | | | 307/104 |
| 2019/0363565 A1 | 11/2019 | Graham et al. | | |
| 2019/0371519 A1 | 12/2019 | Pang et al. | | |
| 2020/0075951 A1 | 3/2020 | Dai et al. | | |
| 2021/0050744 A1 | 2/2021 | Qiu et al. | | |
| 2021/0398733 A1 | 12/2021 | Moussaoui et al. | | |
| 2021/0399577 A1 | 12/2021 | Qiu et al. | | |
| 2021/0408826 A1 | 12/2021 | Liu et al. | | |
| 2022/0416576 A1 | 12/2022 | Ren | | |

FOREIGN PATENT DOCUMENTS

| | | |
|---|---|---|
| KR | 10-2011-0129072 | 12/2011 |
| WO | WO 2005/033350 | 4/2005 |
| WO | WO 2020/068389 | 4/2020 |
| WO | WO 2021/247250 | 12/2021 |

* cited by examiner

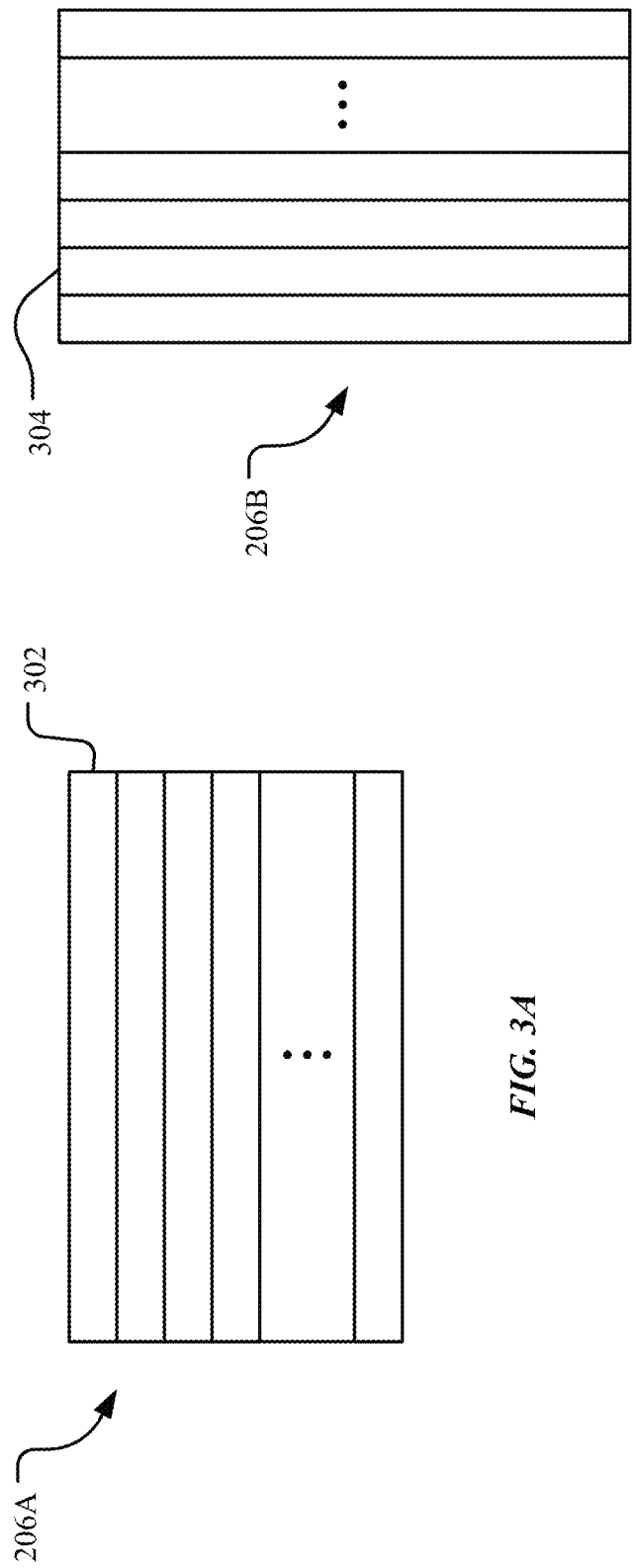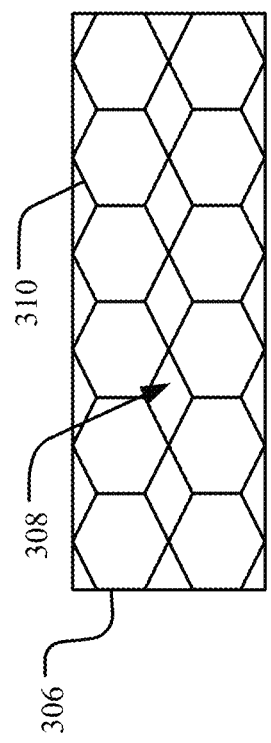

SHIELDING STRUCTURES FOR WIRELESS CHARGING SYSTEMS

CROSS-REFERENCE TO RELATED APPLICATIONS

The present application claims priority to U.S. Provisional Application Ser. No. 63/167,815, entitled "SHIELDING STRUCTURES FOR WIRELESS CHARGING SYSTEMS," filed Mar. 30, 2021, which is incorporated by reference herein in its entirety.

FIELD

Aspects of the present disclosure relate to systems and methods for wireless charging and more particularly to management of magnetic flux in wireless charging systems using shielding structures.

BACKGROUND

Many portable electronic devices, such as smartphones, tablets, smartwatches, and personal computers, are battery powered. These portable electronic devices may incorporate wireless charging circuitries for recharging the battery, which allow battery recharges without a charging cord. However, wireless charging systems may experience energy loss during charging, thereby decreasing charging efficiency.

SUMMARY

Implementations described and claimed herein address the foregoing by providing systems and methods for wireless charging. In one implementation, a portable electronic device comprises a housing, a planar inductor coil, and a ferromagnetic shield. The planar inductor coil is disposed in the housing and comprises a conductive wire wound a plurality of turns about a center point and in increasing radii. The ferromagnetic shield is disposed in the housing and overlaps the planar inductor coil. The ferromagnetic shield comprises a first layer comprising a first plurality of iron-based nanocrystalline ribbons arranged in adjacent rows along a first direction and a second layer comprising a second plurality of iron-based nanocrystalline ribbons overlapping the first layer. The second plurality of iron-based nanocrystalline ribbons is arranged in adjacent rows along a second direction different from the first direction.

In another implementation, a portable electronic device comprises a housing, a planar inductor coil, and a ferromagnetic shield. The planar inductor coil is disposed in the housing and comprises a conductive wire wound a plurality of turns about a center point and in increasing radii. The ferromagnetic shield is disposed in the housing and overlaps the planar inductor coil. The ferromagnetic shield comprises a substrate and a plurality of wires comprising iron-based nanocrystalline materials. The plurality of wires is disposed on the substrate. Each of the plurality of wires radially extends outward from a common region of the substrate to define a two-dimensional radial pattern.

In another implementation, a magnetic component comprises a first layer and a second layer. The first layer comprises a first plurality of iron-based nanocrystalline ribbons arranged in adjacent rows along a first direction. The second layer comprises a second plurality of iron-based nanocrystalline ribbons overlapping the first layer. The second plurality of iron-based nanocrystalline ribbons is arranged in adjacent rows along a second direction different from the first direction.

In another implementation, a magnetic component comprises a substrate and a plurality of wires. The plurality of wires comprises iron-based nanocrystalline materials. The plurality of wires is disposed on the substrate. Each of the plurality of wires radially extends outward from a common region of the substrate to define a two-dimensional radial pattern.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 3A illustrates a top view of an example first nanocrystalline layer of the laminated nanocrystalline stack.

FIG. 3B illustrates a top view of an example second nanocrystalline layer of the laminated nanocrystalline stack.

FIG. 3C illustrates a top view of an example nanocrystalline ribbon of the first nanocrystalline layer.

DETAILED DESCRIPTION

Aspects of the presently disclosed technology relate to systems and methods for managing magnetic flux in wireless charging systems. Portable electronic devices that are battery powered can support wireless charging in alternative or addition to wired charging. For example, a portable electronic device may be charged wirelessly when positioned on a charging surface of a wireless charging device. A transmitter coil disposed below the charging surface produces a magnetic flux that induces a current in a corresponding receiving coil in a wireless power receiver of the portable electronic device. The wireless power receiver rectifies the induced current and applies the resulting power towards battery charging and/or other device operations. The presently disclosed technology mitigates energy loss during wireless charging.

In one aspect, a magnetic component includes one or more nanocrystalline shielding structures managing magnetic flux during wireless charging of a portable electronic device. The magnetic component may be disposed in a housing of the portable electronic device. The portable electronic device includes an inductor coil overlapping the nanocrystalline shielding structure. The inductor coil may be disposed in the housing and includes a conductive wire wound in a plurality of turns about a center point and increasing in radii, such that the inductor coil is substantially planar. The nanocrystalline shielding structure may form, at least in part, a ferromagnetic shield in a high operating frequency range with low eddy current loss. The nanocrystalline shielding structure may be formed using iron-based nanocrystalline materials.

The nanocrystalline shielding structure may include one or more layers, each formed from a plurality of nanocrystalline ribbons. Each of the nanocrystalline ribbons includes a plurality of grains. The nanocrystalline ribbons may comprise cracked nanocrystalline material with air gaps formed between adjacent grains and/or between the nanocrystalline ribbons. Presence of the air gaps and the plurality of grains manages magnetic flux during wireless charging with reduced eddy current loss and magnetic permeability.

The nanocrystalline shielding structure may include a plurality of wires arranged in one or more two-dimensional radial patterns on a substrate. Each of the two-dimensional radial patterns may be defined by the plurality of wires extending outward from a common region of the substrate. The nanocrystalline wires provide a high in-plane magnetic permeability in a plane parallel to the substrate and a low through-plane magnetic permeability in a direction perpendicular to the substrate. The nanocrystalline wires manage magnetic flux during wireless charging without eddy current loss.

Figure 1:
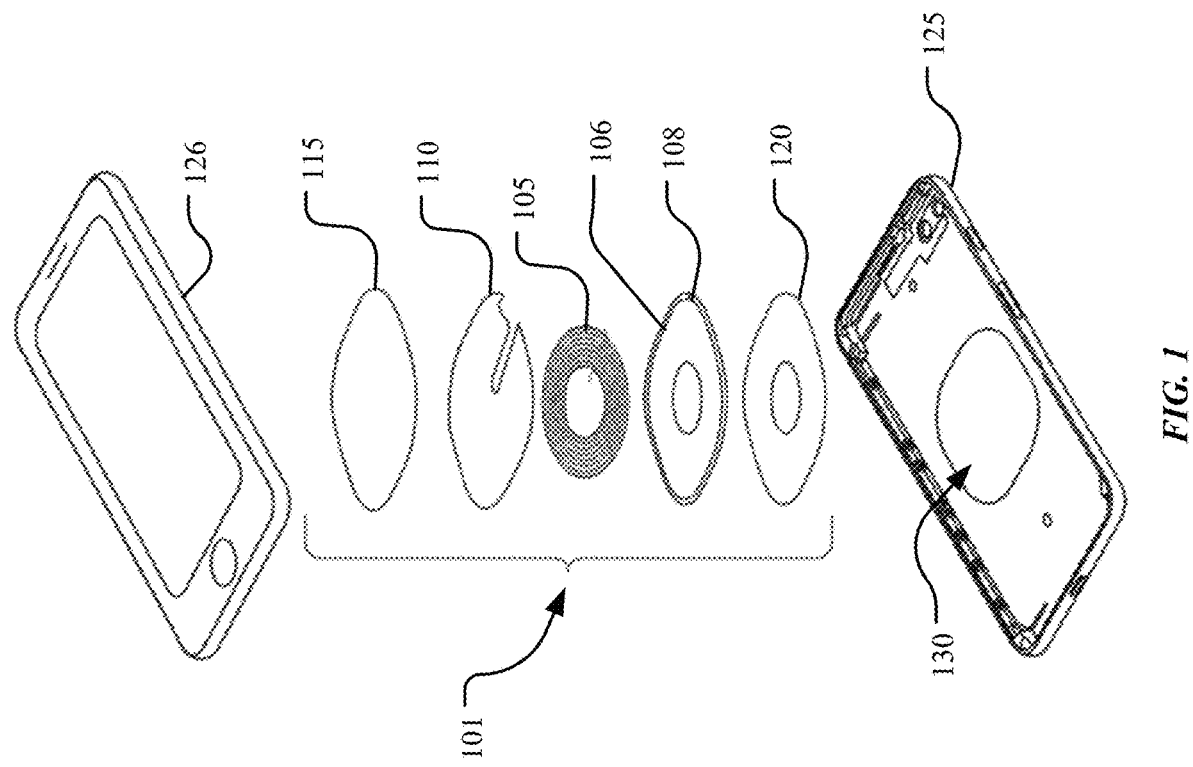
FIG. 1 illustrates an exploded view of an example portable electronic device including an example ferromagnetic shield.

To begin a detailed description of an example portable electronic device 100, reference is made to FIG. 1. The portable electronic device 100 is an electronic device that includes a rechargeable power source, such as a battery. The portable electronic device 100 can be specifically designed to perform various functions for a user. In one implementation, the portable electronic device 100 is a consumer electronic device, such as a smartphone, tablet, laptop, smartwatch, and the like.

The portable electronic device 100 includes electrical components that utilize a power source to operate. The power source of the portable electronic device 100 may include a battery for discharging stored energy to power the electrical components of the portable electronic device 100. In one implementation, to replenish the energy discharged to power the electrical components, the portable electronic device 100 device includes a wireless charging system. In some examples, the wireless charging system is a bi-directional wireless charging system that both wirelessly receives power as well as wirelessly transmits power.

As shown in FIG. 1, the portable electronic device 100 includes a housing enclosing internal components in an internal cavity. The housing may be formed from a top housing 126 and a bottom housing 125. In one implementation, the internal components include a wireless power module 101, a coil 105, an electromagnetic shield 106, a ferromagnetic shield 110, a thermal shield 115, and an adhesive component 120. The wireless power module 101 may include a device detection coil 108 that is positioned around a perimeter of the electromagnetic shield 106.

In one implementation, the electromagnetic shield 106 is positioned in front of the coil 105, such that magnetic flux passes through the electromagnetic shield 106 before reaching the coil 105. For example, magnetic flux passes through the electromagnetic shield 106 when the coil 105 operates as a receiver coil, and magnetic flux is directed toward the electromagnetic shield 106 when the coil 105 operates as a transmitter coil. Exemplary electromagnetic shield 106 is positioned between the coil 105 and the housing 125. In one implementation, the electromagnetic shield 106 can be a shielding layer that is substantially transparent to magnetic flux, permitting a large percentage of magnetic flux to pass through. The electromagnetic shield 106 may also be substantially opaque to electric field, such that electric field generated during operation is substantially blocked by the electromagnetic shield 106. Any voltage generated in the electromagnetic shield 106 by blocking the electric fields may be discharged to ground. Blocking electric fields mitigates noise stemming from a buildup of voltage on the coil 105. The electromagnetic shield 106 may be formed of any material suitable for blocking electric fields while permitting electromagnetic fields to pass through, such as a thin layer of silver.

The thermal shield 115 may include a thermal isolation layer (e.g., graphite) that provides thermal isolation between the wireless power module 101, the battery, and other components of the portable electronic device 100 in which the wireless power module 101 is incorporated. The thermal shield 115 may further include a copper layer that is connected to ground and contributes to the thermal shielding while also capturing stray flux.

The adhesive component 120 attaches the wireless power module 101 to the housing 125. In one implementation, the adhesive component 120 includes one or more sheets of adhesive material. For example, the adhesive component 120 may include a single sheet of an adhesive material, such as pressure sensitive adhesive (PSA), that attaches the wireless power module 101 to the housing 125. In one implementation, the wireless power module 101 is attached to the housing 125 within a cutout area 130 sized and shaped to receive the wireless power module 101. The cutout area 130 may thus save space within the internal cavity and minimize a thickness of the portable electronic device 100. The electromagnetic shield 106 and the adhesive component 120 may include a center opening corresponding to an inner diameter of the coil 105.

The coil 105 may include one or more inductor coils configured to interact with and/or generate magnetic flux. In one implementation, the inductor coil of the coil 105 includes a conductive wire wound in a plurality of turns about a center point and increasing in radii, such that the inductor coil is substantially planar. Stated differently, the conductive wire winds from an inner diameter to an outer diameter in a spiral configuration, such that an overall shape is that of a planar inductor coil formed of a plurality of turns of patterned wire on a flexible substrate. A termination end positioned in the inner diameter of the inductor coil may be routed to an outer diameter by way of a conductive trace. A charging circuitry may be coupled with the inductor coil at one edge location to operate the coil 105 to transmit and/or receive power accordingly.

In the example of FIG. 1, the portable electronic device 100 includes the thermal shield 115 disposed adjacent to the ferromagnetic shield 110 on a first side of the coil 105 and the electromagnetic shield 106 disposed opposite the thermal shield 115 and the ferromagnetic shield 110 on a second side of the coil 105. The ferromagnetic shield 110 may be formed using nanocrystalline materials as described herein.

In one implementation, the ferromagnetic shield 110 is positioned between the coil 105 and the thermal shield 115. The ferromagnetic shield 110 acts as a magnetic field shield for directing magnetic flux towards the coil 105, thereby improving charging efficiency. In doing so, the ferromagnetic shield 110 also acts to direct stray magnetic flux away from non-coil areas of the portable electronic device 100, which may have internal components sensitive to magnetic flux. Exemplary ferromagnetic shield 110 includes one or more nanocrystalline shielding structures.

In one implementation, the nanocrystalline shielding structure of the ferromagnetic shield 110 includes one or more nanocrystalline layers. The nanocrystalline layers may be disposed in an overlapping relationship. Each nanocrystalline layer includes a plurality of nanocrystalline ribbons arranged relative to each other. For example, a first nanocrystalline layer may include a first plurality of nanocrystalline ribbons arranged in adjacent rows along a first direction, and the second nanocrystalline layer may include a second plurality of nanocrystalline ribbons arranged in adjacent rows along a second direction. The first direction and the second direction may be different. For example, the first direction may be perpendicular to the second direction.

The nanocrystalline ribbons may be formed from cracked nanocrystalline material. For example, the nanocrystalline ribbons may include a plurality of grains having a small size (e.g., ranging from about 1 to 2 $\mu$m wide). In one implementation, such fine grains in the nanocrystalline ribbons are formed by rolling strips of nanocrystalline material under mechanical pressure to form cracked nanocrystalline material. During this process, air gaps form between the grains. Air gaps can also be present between adjacent nanocrystalline ribbons in a shielding structure. The cracked nanocrystalline material of the nanocrystalline ribbons has a low eddy current loss and also a reduced magnetic permeability. More particularly, the eddy current loss at high operating frequencies can be significantly reduced due to the presence of the air gaps and the formation of the fine grains of the cracked nanocrystalline material.

In one implementation, the nanocrystalline layers, which comprise cracked nanocrystalline ribbons, each form a thin sheet (e.g., having a thickness ranging from 14 to 20 $\mu$m) with the grains elongated in a plane along a first direction (e.g., a horizontal direction, such as an X-direction or a Y-direction). The resulting ferromagnetic shield 110 structure has a high in-plane permeability in the first direction and a low through-plane permeability in a second direction (e.g., a vertical direction, such as a Z-direction perpendicular to the X-Y plane). The nanocrystalline material has a very high permeability, for example, greater than 10,000 H/m, in the first direction.

The nanocrystalline material may be iron-based, providing optimized metallic properties, including a high conductivity, relative to soft ferrite and similar materials. The iron-based nanocrystalline material has a high magnetic field (B) saturation compared to a soft ferrite material (e.g. greater than 1 Tesla). Thus, the iron-based nanocrystalline material operates well under a permeant magnet environment, such as a direct current (DC) magnetic field. However, nanocrystalline material may have high eddy current loss in some wireless power transfer operating frequencies. Consider, for example, that implementers of the Wireless Power Consortium Qi standard for wireless power transfer typically operate from approximately 100 kHz to 120 kHz, with some implementations extending to 200 kHz and 400 kHz. Wireless charging generally operates in a frequency ranging from approximately 100 kHz to 360 kHz. Notably, eddy current losses in nanocrystalline materials is much higher when subjected to higher operating frequencies of 200 kHz and above, relative to operating frequencies from 100 kHz to 200 kHz. Cracked nanocrystalline ribbons having air gaps between fine grains in implementations of the nanocrystalline shielding structure of the ferromagnetic shield 110, reduces the eddy current loss at relevant operating frequencies of the portable electronic device 100. As the grains become smaller, the eddy current loss decreases. Magnetic permeability is also reduced due to the air gaps added between the fine grains.

In one implementation, the nanocrystalline shielding structure of the ferromagnetic shield 110 includes a plurality of wires comprising nanocrystalline materials disposed on a substrate (e.g., a planar substrate). The plurality of wires may be arranged in one or more two-dimensional patterns, such as radial patterns, on the substrate. In some examples, each of the wires extends radially outward from a common region of the substrate to define a two-dimensional radial pattern that extends outwards from a central area. Multiple two-dimensional radial patterns may be formed in this manner and disposed over each other, with the wires of each two-dimensional radial pattern not overlapping each other. Examples of the nanocrystalline shielding structure that include the nanocrystalline wires have higher in-plane magnetic permeability (e.g., 10,000 H/m or greater) in a plane parallel to the substrate, relative to substantially lower through-plane magnetic permeability (e.g., of 10 H/m or less) in a direction perpendicular to the substrate. The nanocrystalline shielding structure comprising the plurality of wires made from nanocrystalline materials has no to negligible eddy current loss.

Overall, ferromagnetic material of the ferromagnetic shield 110 remains unsaturated during operation of the portable electronic device 100 to receive power wirelessly using the planar inductor coil at a wireless power operating frequency of approximately 100 kHz to 400 kHz. The ferromagnetic material of the ferromagnetic shield 110 remains unsaturated during operation of the portable electronic device 100 to receive power wirelessly using the planar inductor coil at a rated power level of at least 15 watts.

Figure 2:
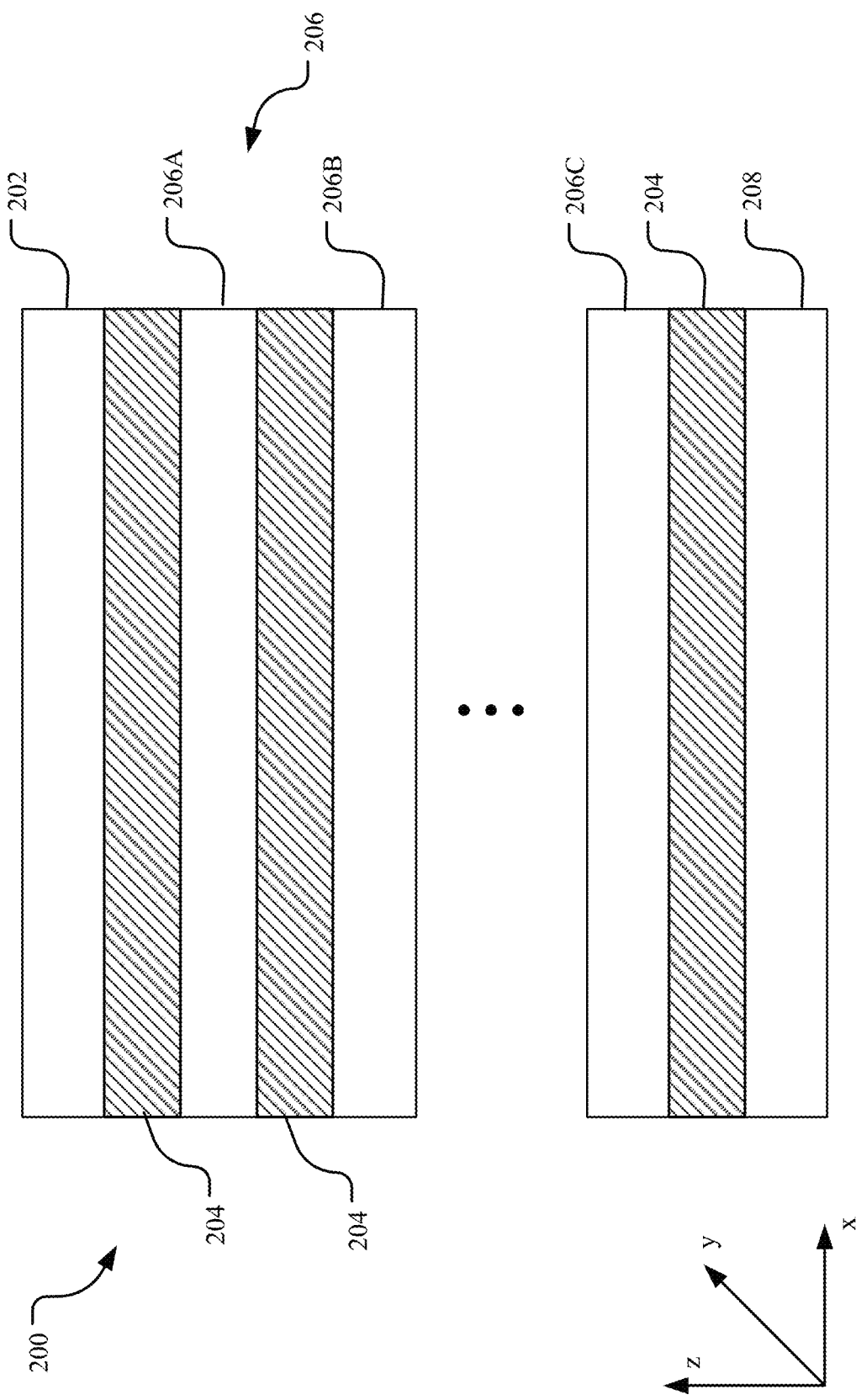
FIG. 2 illustrates a side view of the ferromagnetic shield including an example laminated nanocrystalline stack.

Turning to FIG. 2, a side view of an example nanocrystalline shielding structure 200 including a nanocrystalline stack is shown. In one implementation, the nanocrystalline shielding structure 200 includes a top layer 202, a bottom layer 208, and one or more metal foils 206 (e.g., 206A-206C) interleaved with one or more dielectric layers 204. The top layer 202 and the bottom later 208 may each be a plastic film formed from polyethylene terephthalate (PET) or a similar material. The dielectric layers 204 may be formed from an adhesive, such as PSA, epoxy resin, fiber glass reinforced epoxy, and/or the like.

The metal foils 206 may form the one or more nanocrystalline layers. In one implementation, the top layer 202 is disposed over a top dielectric layer of the dielectric layers 204, while the bottom layer 208 is positioned under a bottom dielectric layer of the dielectric layers 204. The metal foils 206 may be formed of an iron-based nanocrystalline material. The nanocrystalline shielding structure 200 may include any number of the metal foils 206, such as one, two, three, four, five, six or seven, among others.

FIG. 3A illustrates a top view of a first metal foil 206A of the metal foils 206. In one implementation, the first metal foil 206A includes a first plurality of nanocrystalline ribbons 302 arranged in adjacent rows in a first direction. For example, the first direction may be aligned with an X-direction. As can be understood from FIG. 3B, which illustrates a top view of a second metal foil 206B of the metal foils 206, the second metal foil 206B includes a second plurality of nanocrystalline ribbons 304 arranged in adjacent rows aligned in a second direction, such as a Y-direction. The first direction may be different from the second direction. For example, the first direction may be perpendicular to the second direction. The second plurality of nanocrystalline ribbons 304 of the second metal foil 206B may be adhered to the first metal foil 206A.

It will be appreciated that the metal foils 206 may include additional metal foils. For example, the metal foils 206 may include a third metal foil 206C joined to the second metal foil 206B. The third metal foil 206C includes a third plurality of nanocrystalline ribbons aligned with the X-direction. More layers can be added in a similar manner, resulting in layers of the metal foils 206 arranged along alternating directions in the stack of shielding structure 200. As an example, odd number layers of the metal foils 206 can be aligned in the X-direction, while even number layers of the metal foils 206 can be aligned in the Y-direction, or vice versa. In such an arrangement, the metal foils 206 are strongly joined together. The arrangement of the nanocrystalline ribbons may similarly vary within the metal foils 206. For example, the nanocrystalline ribbons in odd number layers may be aligned at 45° from the X-direction, while the nanocrystalline ribbons in even number layers may be aligned at 90° from the nanocrystalline ribbons in the odd number layers.

In one implementation, each of the first plurality of nanocrystalline ribbons 302 has a common first width, and each of the second plurality of nanocrystalline ribbons 304 has a common second width. The first common width and the second common width may be different or the same. In another implementation, the first plurality of nanocrystalline ribbons 302 and/or the second plurality of nanocrystalline ribbons 304 includes ribbons of different widths. Each of the metal foils 206 may have a layer thickness under 25 µm. For example, each of the metal foils 206 may have a layer thickness ranging from approximately 5 µm to 25 µm. In one example, the layer thickness is 5 µm or greater. In another example, the layer thickness is 10 µm or greater. In another example, the layer thickness is 15 µm or greater. In another example, the layer thickness is 20 µm or greater. Similarly, in one example, the layer thickness is 25 µm or less. In another example, the layer thickness is 20 µm or less. In another example, the layer thickness is 15 µm or less. In another example, the layer thickness is 10 µm or less. In one non-limiting example, the metal foils 206 may each be approximately 22 µm thick, the dielectric layers 204 may each be approximately 3 µm thick, and the top layer 202 and the bottom layer 208 may each be approximately 5 µm thick. When the number of the metal foils 206 is four, the nanocrystalline shielding structure 200 may have a total thickness of approximately 105 µm and a dimension of approximately 5 cm wide by approximately 5 cm long.

Referring to FIG. 3C, a top view of an example nanocrystalline ribbon 306 the metal foils 206 is shown. In one implementation, the nanocrystalline ribbon 306 is made from cracked nanocrystalline material. More particularly, the nanocrystalline ribbon 306 includes a plurality of air gaps 308 disposed between a plurality of grains 310. For example, at least two or more adjacent grains 310 may be separated by the air gaps 308. Each of the plurality of grains 310 may be small, for example having an average grain size ranging from approximately 1 nm to 1 µm. In this manner, one or more ribbons of the first plurality of nanocrystalline ribbons 302, the second plurality of nanocrystalline ribbons 304, and/or the like may be cracked between the plurality of grains 310. The air gaps 308 may be further disposed between adjacent cracked nanocrystalline ribbons.

The nanocrystalline ribbons 306 of the metal foils 206 can be formed by spinning and fast cooling, followed by drawing. The nanocrystalline ribbons 306 may have a thickness ranging from approximately 15 µm to 30 µm. In one example, the nanocrystalline ribbons 306 comprises a polycrystalline material with grain sizes below 100 nm. The nanocrystalline ribbons 306 may be iron-based. Such iron-based nanocrystalline material of the nanocrystalline ribbons 306 provides optimized magnetic properties. For example, the nanocrystalline ribbons 306 may have a high magnetic permeability (e.g., 10,000 to 15,000) relative to that of ferrite (e.g., 3,000). The nanocrystalline ribbons 306 may also have a higher in-plane magnetic permeability (e.g., in an X-Y plane) relative to a lower through-plane magnetic permeability (e.g., in a Z-direction perpendicular to the X-Y plane). For example, the nanocrystalline ribbons 306 may have a magnetic permeability of less than 10 in the Z-direction. The nanocrystalline ribbons 306 may include silicon (Si) from 8.0 to 9.4 wt %, niobium (Nb) from 4.8 wt % to 6.4 wt %, boron (B) from 1.0 wt % to 2.2 wt %, copper (Cu) from 0.80 wt % to 2.20 wt % with iron (Fe) as a balance.

In one implementation, a sheet of nanocrystalline material is cut into strips prior to rolling. For example, the strips may be approximately 1 to 2 cm wide. Rolling and cracking can be done by using a roller at room temperature. The rolling forms the cracked nanocrystalline material of the nanocrystalline ribbons 306, with the air gaps 308 formed between the grains 310. The rolling pattern and pressure of the roller may vary depending upon a level of cracking. A degree of cracking in the nanocrystalline ribbons 306 may be measured by a degree of magnetic permeability. Rolling the strips reduces the magnetic permeability in the resulting cracked nanocrystalline material. The cracked nanocrystalline material may have a reduced magnetic permeability of about 200, which is significantly lower than that the sheet of nanocrystalline material, which may have, for example, a magnetic permeability of 10,000 to 15,000.

In one implementation, the cracked nanocrystalline material of the nanocrystalline ribbons 306 is annealed at elevated temperatures ranging from approximately 300° C. to 550° C. to yield optimized magnetic properties. The annealing promotes alignment of the grains 310. For example, the nanocrystalline ribbons 306 may be annealed at a first temperature (e.g. 300° C.) for a first period of time (e.g. 1 hour) and a second temperature (e.g. 450° C.) higher than the first temperature for a second period of time (e.g. 1 hour).

The grain size of the grains 310 of the cracked nanocrystalline material of the nanocrystalline ribbons 306 may be approximately 50 nm or less. In one example, the grain size is 40 nm or less. In another example, the grain size is 30 nm or less. In another example, the grain size is 20 nm or less. In another example, the grain size is 10 nm or less. In another example, the grain size is 5 nm or less. In another example, the grain size is 1 nm or less. The nanocrystalline ribbons 306 may have a thickness ranging from approximately 10 µm to 25 µm. The nanocrystalline ribbons 306 may have a density of approximately 7.0 g/cm³ or greater. In one example, the nanocrystalline ribbons 306 has a density of 7.1 g/cm³ or greater. In another example, the nanocrystalline ribbons 306 has a density of 7.2 g/cm³ or greater. In another example, the nanocrystalline ribbons 306 has a density of 7.3 g/cm³ or greater.

The nanocrystalline shielding structure 200 may have an in-plane magnetic permeability ranging from approximately 100 to 300 in a plane of the nanocrystalline shielding structure 200. In one example, the nanocrystalline shielding structure 200 has an in-plane magnetic permeability of 300 or less in the plane of the nanocrystalline shielding structure 200. In another example, the nanocrystalline shielding structure 200 has an in-plane magnetic permeability of 250 or less in the plane of the nanocrystalline shielding structure 200. In another example, the nanocrystalline shielding structure 200 has an in-plane magnetic permeability of 200 or less in the plane of the nanocrystalline shielding structure 200. In another example, the nanocrystalline shielding structure 200 has an in-plane magnetic permeability of 150 or less in the plane of the nanocrystalline shielding structure 200.

Similarly, in one example, the nanocrystalline shielding structure 200 has an in-plane magnetic permeability of 100 or greater in the plane of the nanocrystalline shielding structure 200. In another example, the nanocrystalline shielding structure 200 has an in-plane magnetic permeability of 150 or greater in the plane of the nanocrystalline shielding structure 200. In another example, the nanocrystalline shielding structure 200 has an in-plane magnetic permeability of 200 or greater in the plane of the nanocrystalline shielding structure 200. In another example, the nanocrystalline shielding structure 200 has an in-plane magnetic permeability of 250 or greater in the plane of the nanocrystalline shielding structure 200.

The nanocrystalline shielding structure 200 may have a through-plane magnetic permeability of 10 or less in a direction perpendicular to the surface of the nanocrystalline shielding structure 200. In one example, the nanocrystalline shielding structure 200 has a through-plane magnetic permeability of 5 or less in a direction perpendicular to the surface of the nanocrystalline shielding structure 200. In another example, the nanocrystalline shielding structure 200 has a through-plane magnetic permeability of 3 or less in a direction perpendicular to the surface of the nanocrystalline shielding structure 200. In another example, the nanocrystalline shielding structure 200 has a through-plane magnetic permeability of 1 or less in a direction perpendicular to the surface of the nanocrystalline shielding structure 200.

As described herein, the portable electronic device 100 is operable to receive wireless power transfer at a frequency range from approximately 100 kHz to 300 kHz. The ferromagnetic material of the nanocrystalline shielding structure 200 remains unsaturated during operation of the portable electronic device 100 to receive power wirelessly using the coil 105 at a rated power level of at least 15 watts. As used herein, rated power refers to a maximum wireless power level that an electronic device, such as the portable electronic device 100, is rated to operate under. For example, in connection with Wireless Power Consortium Qi standards, electronic devices using a base power profile are typically rated for 5 watt operation, and electronic devices using an extended power profile are typically rated for 15 watt operation.

Figure 4:
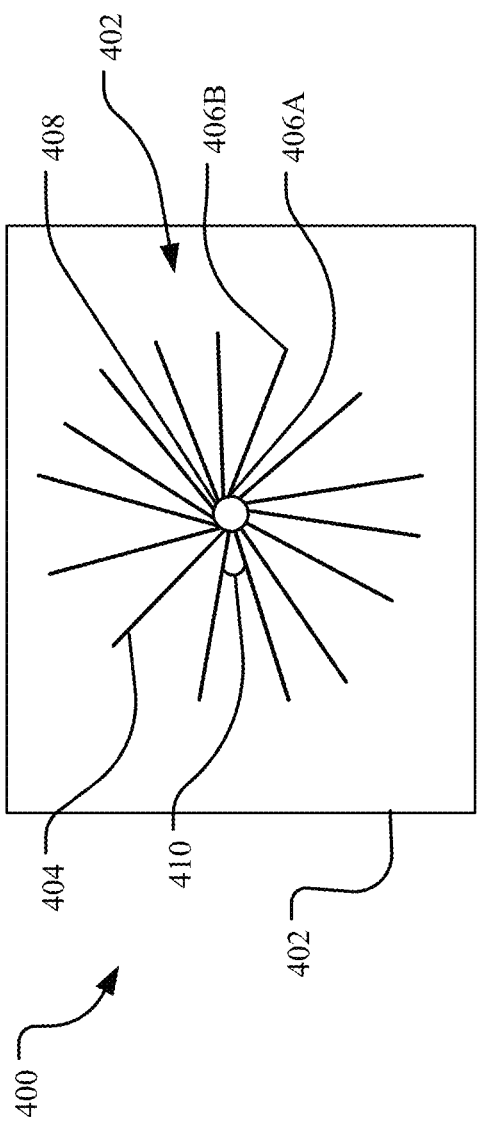
FIG. 4 shows another example ferromagnetic shield including nanowires.
Figure 5:
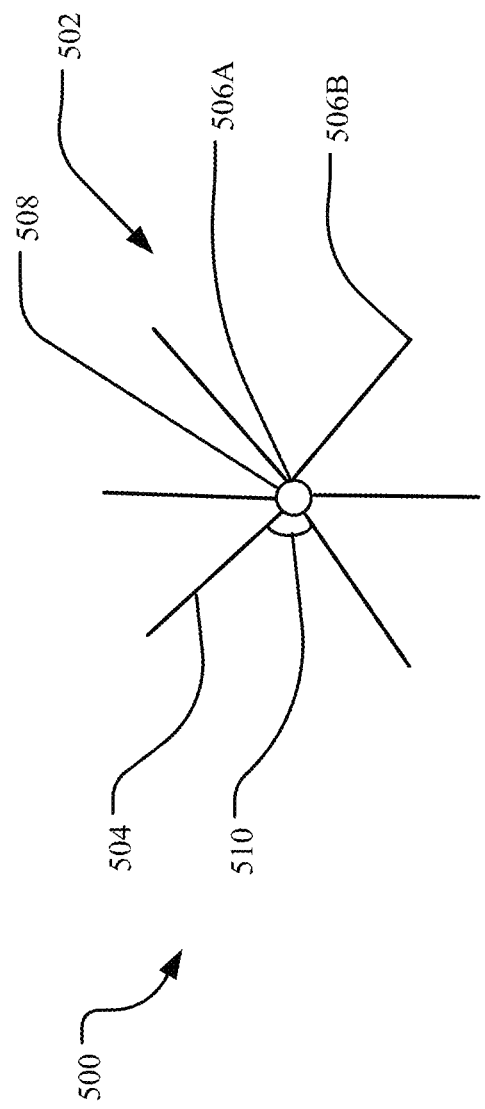
FIG. 5 shows the nanowires arranged in an example two-dimensional radial pattern.

Turning to FIGS. 4-5, in one implementation, the ferromagnetic shield 110 is formed from a nanocrystalline shielding structure 400 including a plurality of wires (e.g., nanowires) arranged in one or more patterns on a substrate 402. The substrate 402 may be planar. The patterns may each be a two-dimensional pattern, such as a two-dimensional radial pattern having an angle.

In one implementation, the nanocrystalline shielding structure 400 includes a first plurality of nanocrystalline wires 404. Each nanocrystalline wire 404 has a first end 406A and a second end 406B. The first end 406A of each nanocrystalline wire 404 is connected to a common region 408 on the substrate 402. Two adjacent nanocrystalline wires 404 may be separated by a first angle 410. Each nanocrystalline wire 404 extends radially outward from the common region 408 in a plane to form a first two-dimensional radial pattern 412.

In one implementation, the nanocrystalline shielding structure 400 may include a second plurality of nanocrystalline wires 504 defining a second two-dimensional radial pattern 500, as can be understood from FIG. 5. In one implementation, the first two-dimensional radial pattern 412 is disposed over the second two-dimensional radial pattern 500 without the first plurality of nanocrystalline wires 404 overlapping the second plurality of nanocrystalline wires 504. As shown in FIG. 5, each of the second plurality of nanocrystalline wires 504 have a first end 506A and a second end 506B. The first end 506A of each of the nanocrystalline wires 504 is connected to a second common region 508 of the substrate 402 and extends radially outward from the second common region 508 in a plane to form the second two-dimensional radial pattern 500. Two adjacent nanocrystalline wires 504 are separated by a second angle 510. The second two-dimensional radial pattern 500 may be disposed over the first two-dimensional radial pattern 412. The second common region 508 of the second two-dimensional radial pattern 500 may be aligned with the common region 408 of the first two-dimensional radial pattern 412. The second two-dimensional radial pattern 500 may be offset at an angle from the first two-dimensional radial pattern 412.

In one implementation, the first plurality of wires 404 is not overlapping with the second plurality of wires 504. The common region 408 may overlap the center point of the coil 105. In one implementation, the second common region 508 may overlap with the common region 408. The first angle 410 between two immediately adjacent nanocrystalline wires of the first two-dimensional radial pattern 412 may be a first constant. The second angle 510 between two immediately adjacent nanocrystalline wires of the second two-dimensional radial pattern 500 may be a second constant. The first angle 410 may be different than the second angle 510. Each of the second plurality of wires 504 defining the second two-dimensional radial pattern 500 is equidistant from adjacent wires.

In one implementation, the nanocrystalline wires 404 and 504 comprise nanocrystalline materials. The two-dimensional radial patterns 412, 500 have a high magnetic permeability of approximately 10,000 to 15,000 along the radial direction, such that the nanocrystalline shielding structure 400 has a high planar magnetic permeability (e.g., in an X-Y plane), relative to a low through-plane magnetic permeability (e.g., in a Z-direction perpendicular to the X-Y plane). For example, the nanocrystalline shielding structure 400 may have a magnetic permeability of 10 or less in the Z-direction. The nanocrystalline shielding structure 400 has an in-plane magnetic permeability of 10,000 or greater and a through-plane magnetic permeability of 10 or less. The ferromagnetic shield 110 formed from the nanocrystalline shielding structure 400 has no to negligible eddy current loss.

As described herein, the portable electronic device 100 is operable to receive wireless power transfer in a frequency ranging from approximately 100 kHz to 300 kHz. The ferromagnetic material of the nanocrystalline shielding structure 400 remains unsaturated during operation of the portable electronic device 100 to receive power wirelessly using the coil 105 at a rated power level of at least 15 watts.

In one implementation, the nanocrystalline wires of the nanocrystalline shielding structure 400 have diameters ranging from approximately 0.1 mm to 1.0 mm. In one example, the nanocrystalline wires have diameters of 1.0 mm or less. In another example, the nanocrystalline wires have diameters of 0.7 mm or less. In another example, the nanocrystalline wires have diameters of 0.5 mm or less. In another example, the nanocrystalline wires have diameters of 0.3 mm or less. Similarly, in one example, the nanocrystalline wires have diameters of 0.1 mm or less. In another example, the nanocrystalline wires have diameters of 0.3 mm or less. In another example, the nanocrystalline wires have diameters of 0.5 mm or less. In another example, the nanocrystalline wires have diameters of 0.7 mm or less. The nanocrystalline wires of the nanocrystalline shielding structure 400 may include Si from 8.0 to 9.4 wt %, Nb from 4.8 wt % to 6.4 wt %, B from 1.0 wt % to 2.2 wt %, Cu from 0.80 wt % to 2.20 wt % with Fe as a balance.

Referring to FIGS. 6-9, various examples of the presently disclosed technology are provided. It will be appreciated that the examples and results are exemplary only and not intended to be limiting. Magnetic material L and Q tests were performed using L and Q sweep with an E4990A Impedance Analyzer from 10 kHz to 3 MHz. The tests were performed with a magnetic material placed on a single side of a testing coil and again with a magnetic material placed on both sides of a testing coil.

Table 1 lists the samples tested. Samples 2-6 had reduced magnetic permeability due to cracking. Sample 6 has the lowest magnetic permeability of 200 and the most cracking among all Samples 2-6. Sample 1 has no cracking.

TABLE 1

| Sample No. | Labels | Material | Permeability | Dimension (mm) |
|---|---|---|---|---|
| 1 | MS 10000-0.1 mm | Fe-based Nanocrystalline (NC) | 10,000 | 0.1 |
| 2 | MS 1400-0.1 mm | Fe-based NC | 1400 | 0.1 |
| 3 | MS700-0.1 mm | Fe-based NC | 700 | 0.1 |
| 4 | MS500-0.1 mm | Fe-based NC | 500 | 0.1 |
| 5 | MS300-0.1 mm | Fe-based NC | 300 | 0.1 |
| 6 | MS200-0.1 mm | Fe-based NC | 200 | 0.1 |
| 7 | MS1400-1 mm | Fe-based NC | 1400 | 1 |
| 8 | DMR95-1 mm | MnZn ferrite | n/a | 1 |
| 9 | FS700-0.1 mm | NiZn feerite | n/a | 0.1 |
| 10 | FS600B-0.1 mm | NiZn ferrite | n/a | 0.1 |
| 11 | Winding only | Coil only without magnetic material on any side | n/a | n/a |

Figure 6:
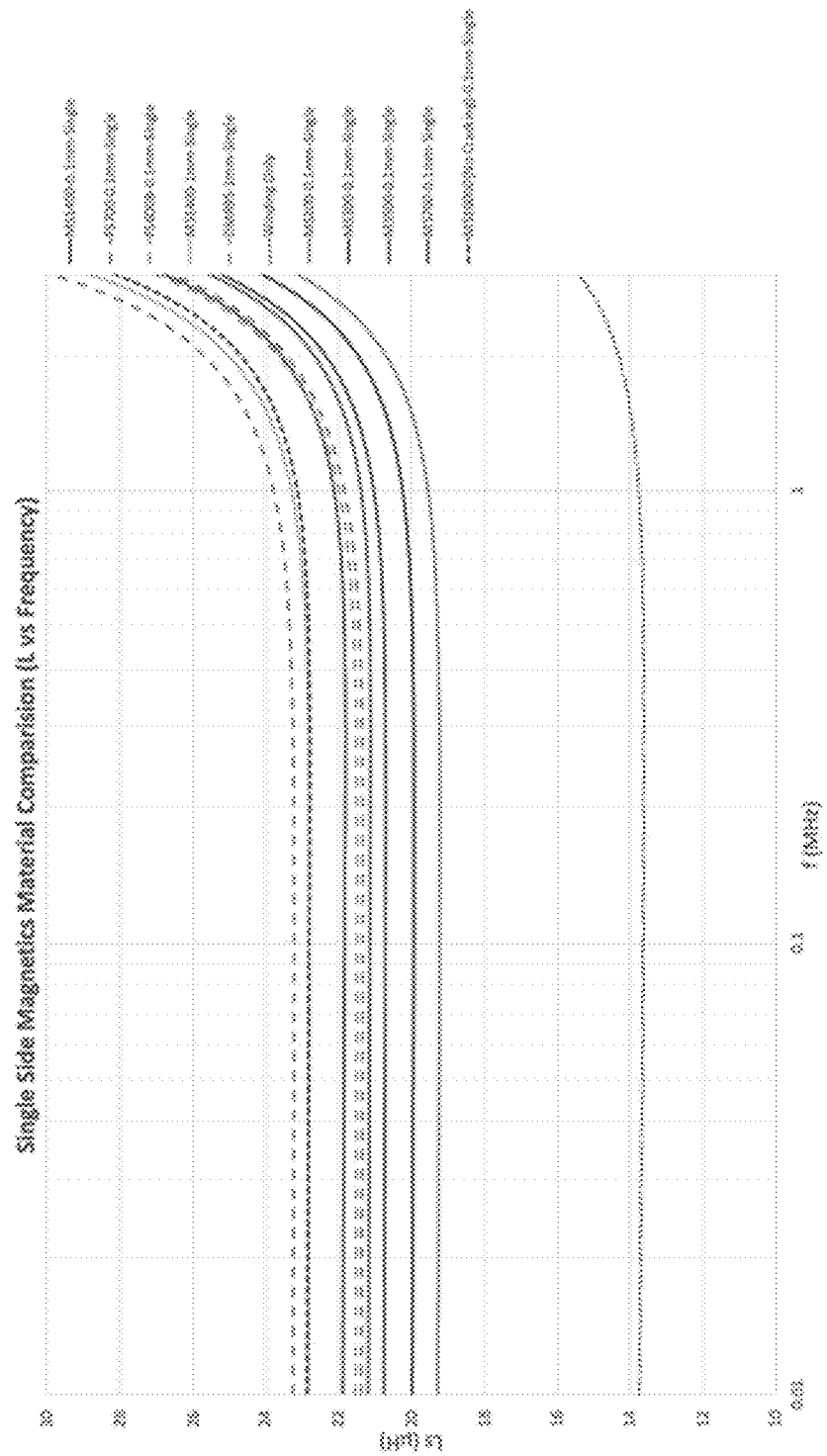
FIG. 6 shows a plot of inductance versus frequency, ranging from 10 kHz to 3 MHz, for a magnetic material placed on a single side of a testing coil according to the presently disclosed technology.

FIG. 6 shows a plot of the inductance versus frequency for a magnetic material placed on a single side of a testing coil. As shown in FIG. 6, the inductance Ls for all materials remains flat until about 1 MHz. The inductance Ls also decreases with increased cracking, as can be understood by comparing Sample 1 with Samples 2-6. The inductance of Sample 1 (nanocrystalline material) is higher than Samples 8-10 (ferrites) due to higher magnetic permeability than that the ferrite.

Figure 7:
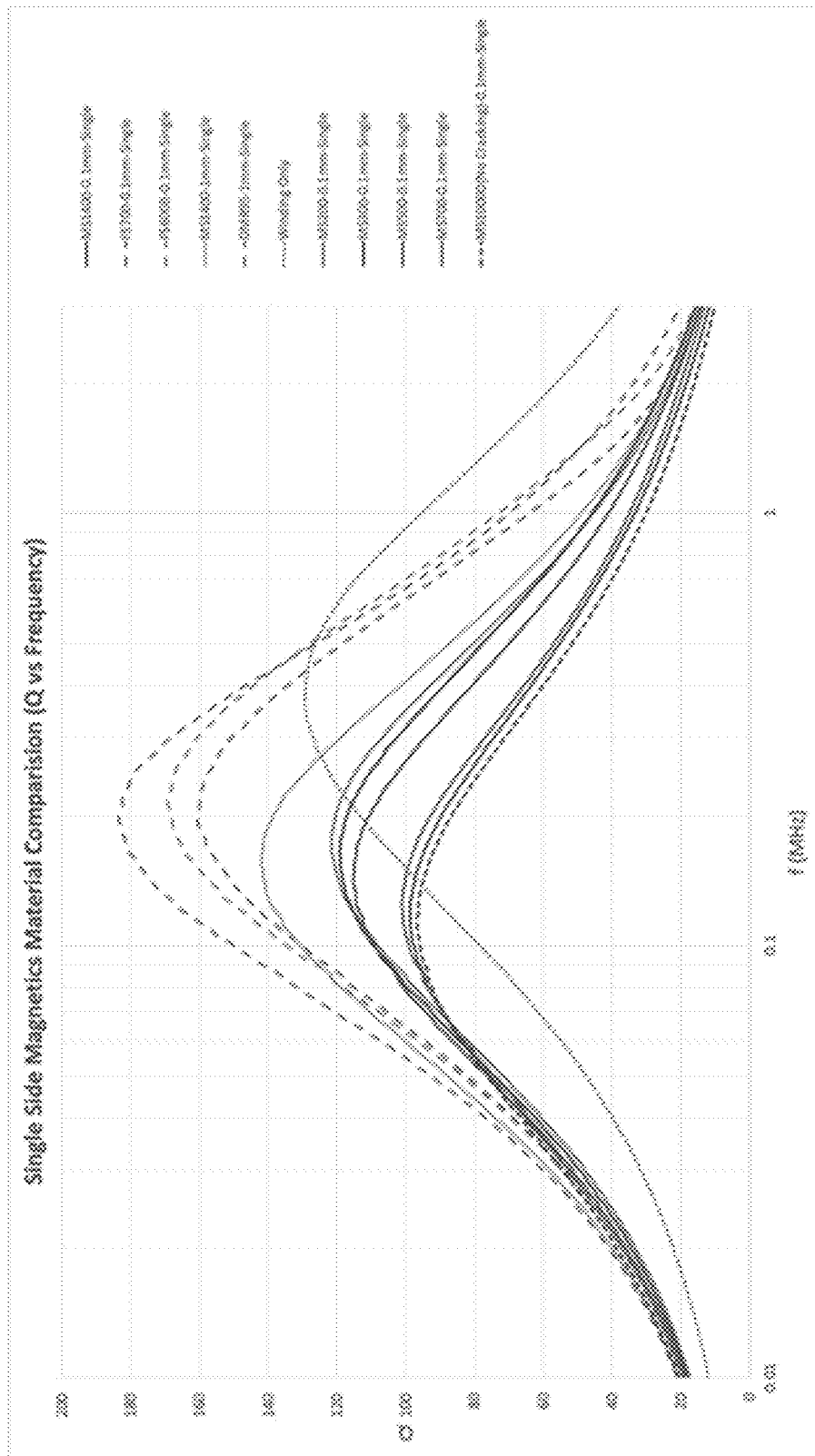
FIG. 7 shows a plot of loss factor Q versus frequency, ranging from 10 kHz to 3 MHz, for a magnetic material placed on a single side of a testing coil according to the presently disclosed technology.

FIG. 7 shows a plot of the loss factor Q versus frequency for a magnetic material of FIG. 6. As can be understood by comparing Sample 1 (nanocrystalline material) to Samples 8-10 (ferrites), the ferrite materials resulted in higher loss than the nanocrystalline material. A larger dimension of 1 mm resulted in higher loss than the smaller dimension of 0.1 mm for the same material, as shown by Sample 2 to Sample 7 of Fe-based nanocrystalline material having the same cracking. When cracking increases, Samples 2-6 revealed that the loss factor Q shifted the peak to a higher frequency with increased cracking and reduced magnetic permeability.

Figure 8:
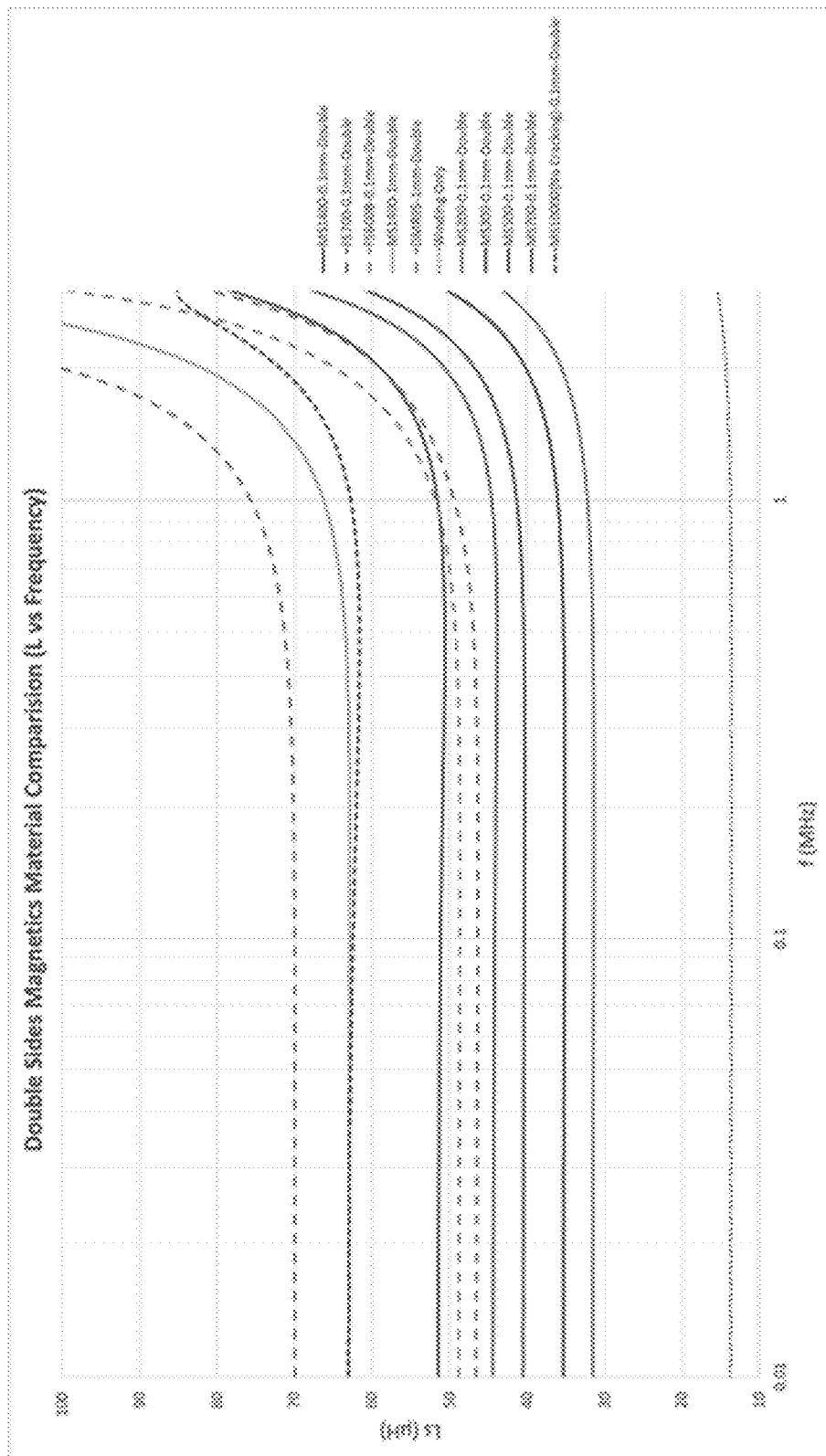
FIG. 8 shows a plot of inductance versus frequency, ranging from 10 kHz to 3 MHz, for a magnetic material placed on both sides of a testing coil according to the presently disclosed technology.

FIG. 8 shows a plot of the inductance versus frequency for a magnetic material placed on both sides of a testing coil. As shown in FIG. 8, the inductance Ls for all materials remain flat until about 1 MHz. Also, the inductance Ls remains flat until about 1 MHz. The inductance Ls decreases with increased cracking, as shown with a comparison of Sample 1 with Samples 2-6. The inductance of Sample 1 (nanocrystalline material) is higher than Samples 8-10 (ferrites) due to higher magnetic permeability relative to ferrite.

Figure 9:
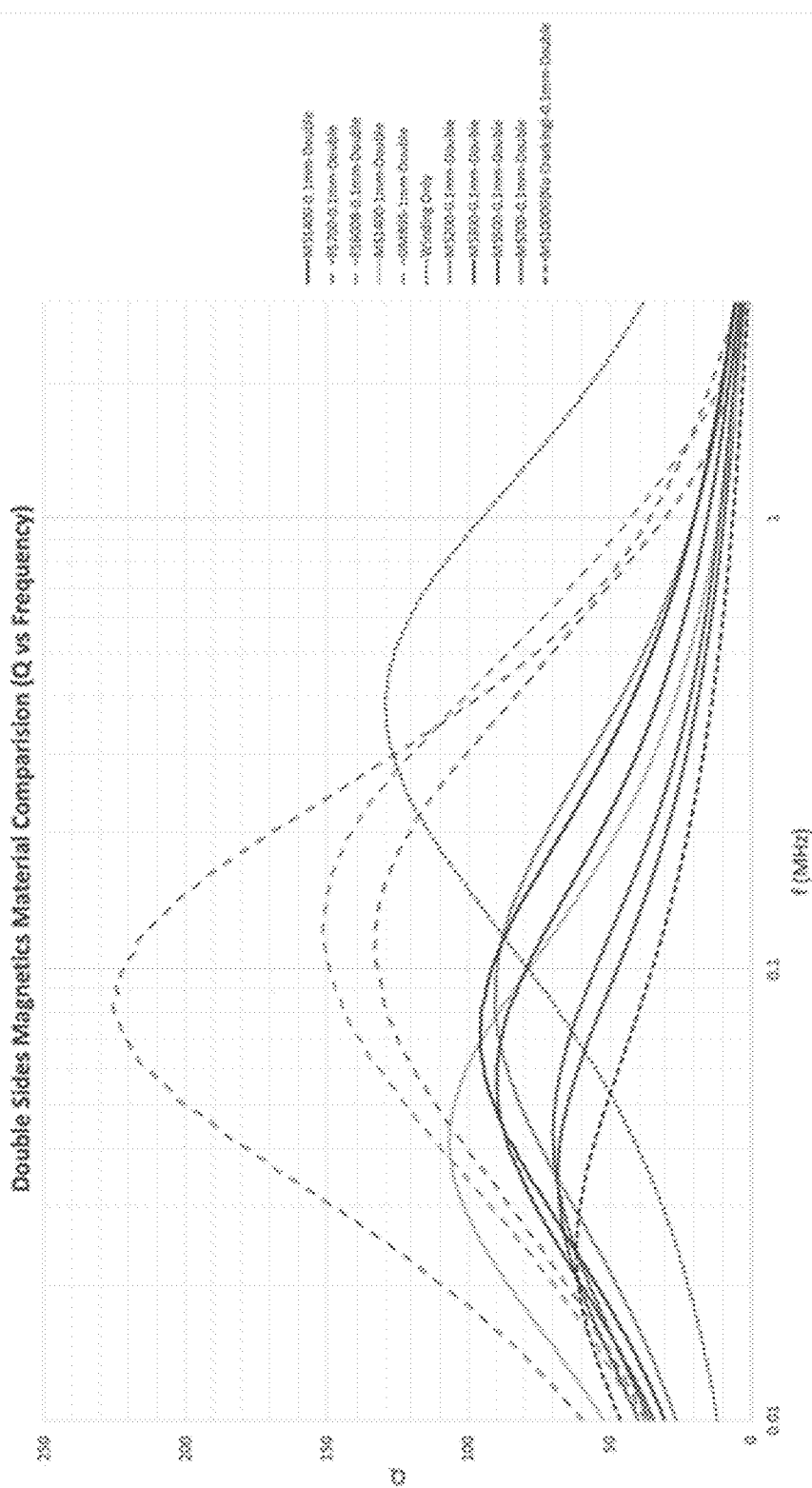
FIG. 9 shows a plot of loss factor Q versus frequency, ranging from 10 kHz to 3 MHz, for a magnetic material placed on both sides of a testing coil according to the presently disclosed technology.

FIG. 9 shows a plot of the loss factor Q versus frequency for a magnetic material of FIG. 8. As shown, the loss factor Q shifts the peak to a higher frequency for Samples 1-6 with increased cracking and reduced magnetic permeability. While similar trends were observed as that for the magnetic material placed on one side, the inductance and loss factor values of the magnetic material placed on both sides differed.

Table 2 lists the inductance (Ls), loss factor (Q), and resistance (R) values of a soft magnetic iron-based nanocrystalline sample with cracking, i.e. Sample 6 (MS200-0.1 mm), at various operating frequencies ranging from 100 kHz to 500 kHz. The values are shown for a magnetic material placed on a single side and both sides of a coil.

TABLE 2

| Frequency (kHz) | Single side | | | Both sides | | |
|---|---|---|---|---|---|---|
| | L (uH) | Q | R (mΩ) | L (uH) | Q | R (mΩ) |
| 100 | 19.22 | 108.6 | 111.2 | 31.36 | 89.8 | 219.4 |
| 200 | 19.22 | 120.4 | 100.3 | 31.33 | 72.1 | 272.9 |
| 300 | 19.23 | 106.4 | 113.6 | 31.35 | 56.1 | 351.4 |
| 400 | 19.24 | 92.3 | 130.9 | 31.39 | 45.8 | 431.0 |
| 500 | 19.27 | 80.6 | 150.2 | 31.46 | 38.7 | 510.5 |

Table 3 lists the Ls, Q, and R values of Samples 1 and 6 (MS200-0.1 mm) at various frequencies for the magnetic material placed on both sides. Note that at the same frequencies, the resistances were much higher for Sample 1 than Sample 6, while the loss factor Q values were lower for Sample 1 than Sample 6.

TABLE 3

| Frequency (kHz) | Sample 1-MS10000-0.1 mm | | | Sample 6-MS200-0.1 mm | | |
|---|---|---|---|---|---|---|
| | L (uH) | Q | R (mΩ) | L (uH) | Q | R (mΩ) |
| 100 | 62.46 | 34.9 | 1125.4 | 31.36 | 89.8 | 219.4 |
| 200 | 62.00 | 22.3 | 1743.7 | 31.33 | 72.1 | 272.9 |
| 300 | 61.75 | 16.8 | 2315.6 | 31.35 | 56.1 | 351.4 |
| 400 | 61.64 | 13.7 | 2823.8 | 31.39 | 45.8 | 431.0 |
| 500 | 61.62 | 11.7 | 3296.6 | 31.46 | 38.7 | 510.5 |

Any ranges cited herein are inclusive. The terms "substantially" and "about" used throughout this Specification are used to describe and account for small fluctuations. For example, these terms can refer to ±5%.

It is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A magnetic component comprising:
   a first layer comprising a first plurality of iron-based nanocrystalline ribbons arranged in adjacent rows along a first direction; and
   a second layer comprising a second plurality of iron-based nanocrystalline ribbons overlapping the first layer, the second plurality of iron-based nanocrystalline ribbons arranged in adjacent rows along a second direction different from the first direction, wherein the first plurality of iron-based nanocrystalline ribbons and the second plurality of iron-based nanocrystalline ribbons form a ferromagnetic shield having an in-plane magnetic permeability of at least 10,000 and a through-plane magnetic permeability of less than 10.

2. The magnetic component of claim 1, wherein the second direction is perpendicular to the first direction.

3. The magnetic component of claim 1, wherein each of the first plurality of iron-based nanocrystalline ribbons has a common first width, and each of the second plurality of iron-based nanocrystalline ribbons has a common second width.

4. The magnetic component of claim 3, wherein the common first width and the common second width are different.

5. The magnetic component of claim 1, wherein at least one of the first plurality of iron-based nanocrystalline ribbons or the second plurality of iron-based nanocrystalline ribbons comprises ribbons of different widths.

6. The magnetic component of claim 1, wherein ferromagnetic material of the ferromagnetic shield remains unsaturated during operation of a portable electronic device to receive power wirelessly using a planar inductor coil of the portable electronic device at a wireless power operating frequency of 100 kHz to 400 kHz.

7. The magnetic component of claim 6, wherein the ferromagnetic material of the ferromagnetic shield remains unsaturated during the operation of the portable electronic device to receive the power wirelessly using the planar inductor coil at a rated power level of at least 15 watts.

8. The magnetic component of claim 1, wherein the first plurality of iron-based nanocrystalline ribbons has an average grain size of 1 nm to 100 nm.

9. The magnetic component of claim 1, wherein each ribbon of the first plurality of iron-based nanocrystalline ribbons comprises a plurality of grains, wherein at least two or more adjacent grains are separated by air gaps.

10. The magnetic component of claim 1, wherein one or more ribbons of the first plurality of iron-based nanocrystalline ribbons are formed from cracked nanocrystalline material.

11. The magnetic component of claim 1, further comprising an adhesive disposed on at least one of the first layer or the second layer.

12. The magnetic component of claim 1, further comprising a dielectric layer adhered between the first layer and the second layer.

13. The magnetic component of claim 1, wherein each of the first layer and the second layer has a thickness of 25 μm or less.

14. The magnetic component of claim 1, wherein the first plurality of iron-based nanocrystalline ribbons and the second plurality of iron-based nanocrystalline ribbons comprise Si from 8.0 to 9.4 wt %, Nb from 4.8 wt % to 6.4 wt %, B from 1.0 wt % to 2.2 wt %, and Cu from 0.80 wt % to 2.20 wt %, with Fe as a balance.

15. The magnetic component of claim 1, wherein the ferromagnetic shield is configured to overlap an inductor coil.

16. The magnetic component of claim 15, wherein the inductor coil comprises a conductive wire wound a plurality of turns about a center point.

17. The magnetic component of claim 15, wherein ferromagnetic material of the ferromagnetic shield remains unsaturated during operation of a portable electronic device to receive power wirelessly using the inductor coil.

18. The magnetic component of claim 1, wherein the ferromagnetic shield is receivable in a housing.

19. A portable electronic device comprising:
    a housing;
    a planar inductor coil disposed in the housing and comprising a conductive wire wound a plurality of turns about a center point and in increasing radii;
    a ferromagnetic shield disposed in the housing and overlapping the planar inductor coil, the ferromagnetic shield comprising:
       a first layer comprising a first plurality of iron-based nanocrystalline ribbons arranged in adjacent rows along a first direction; and
       a second layer comprising a second plurality of iron-based nanocrystalline ribbons overlapping the first layer, the second plurality of iron-based nanocrystalline ribbons arranged in adjacent rows along a second direction different from the first direction, wherein the first plurality of iron-based nanocrystalline ribbons and the second plurality of iron-based nanocrystalline ribbons form a ferromagnetic shield having an in-plane magnetic permeability of at least 10,000 and a through-plane magnetic permeability of less than 10.

20. The portable electronic device of claim 19, wherein the first plurality of iron- based nanocrystalline ribbons has an average grain size of 1 nm to 100 nm.

21. The portable electronic device of claim 19, wherein each ribbon of the first plurality of iron-based nanocrystalline ribbons comprises a plurality of grains, wherein at least two or more adjacent grains are separated by air gaps.

22. The portable electronic device of claim 19, wherein one or more ribbons of the first plurality of iron-based nanocrystalline ribbons are formed from cracked nanocrystalline material.

23. The portable electronic device of claim 19, further comprising an adhesive disposed on at least one of the first layer or the second layer.

24. The portable electronic device of claim 19, further comprising a dielectric layer adhered between the first layer and the second layer.

* * * * *